United States Patent
Tsai et al.

(10) Patent No.: US 8,627,949 B2
(45) Date of Patent: Jan. 14, 2014

(54) TRANSMISSION MECHANISM AND SURFACE MOUNT DEVICE USING THE SAME

(75) Inventors: Tsung-Chih Tsai, New Taipei (TW); Chao-An Kang, New Taipei (TW); Shang-Yu Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 123 days.

(21) Appl. No.: 13/279,472

(22) Filed: Oct. 24, 2011

(65) Prior Publication Data
US 2012/0255837 A1 Oct. 11, 2012

(30) Foreign Application Priority Data

Apr. 6, 2011 (TW) .............................. 100111725 A

(51) Int. Cl.
*B65G 23/44* (2006.01)

(52) U.S. Cl.
USPC .............................. 198/813; 700/121; 29/833

(58) Field of Classification Search
USPC ............ 198/813, 346.2; 221/25, 74; 414/411, 414/416, 417; 156/539, 584; 29/783, 809, 29/833
See application file for complete search history.

(56) References Cited

U.S. PATENT DOCUMENTS

| | | | | |
|---|---|---|---|---|
| 5,930,140 A * | 7/1999 | Asai et al. | ..................... | 700/121 |
| 5,941,674 A * | 8/1999 | Briehl | ..................... | 414/416.08 |
| 6,139,246 A * | 10/2000 | Briehl | ..................... | 414/416.01 |
| 6,202,728 B1 * | 3/2001 | Takada et al. | ................. | 156/750 |
| 6,318,437 B1 * | 11/2001 | Yoo et al. | ..................... | 156/750 |
| 6,368,045 B1 * | 4/2002 | Ashman et al. | ............... | 414/411 |
| 6,814,258 B2 * | 11/2004 | Katsumi | ..................... | 221/211 |
| 8,079,396 B2 * | 12/2011 | Rachkov | ..................... | 156/539 |
| 2002/0000359 A1 * | 1/2002 | Asai et al. | ................. | 198/346.2 |
| 2002/0069517 A1 * | 6/2002 | Miura et al. | ..................... | 29/743 |
| 2008/0023293 A1 * | 1/2008 | Uratani et al. | ............ | 198/346.2 |

* cited by examiner

*Primary Examiner* — Ramya Burgess
*Assistant Examiner* — Thomas Randazzo
(74) *Attorney, Agent, or Firm* — Altis Law Group, Inc.

(57) ABSTRACT

A transmission mechanism includes a feeder, a belt furling module, a tension maintaining module, and a carrier belt. The tension maintaining module and the belt furling module are positioned on the feeder, and the carrier belt runs along the feeder, the tension maintaining module, and the belt furling module in that order. The tension maintaining module includes a base, a pivot shaft slidably positioned on the base, and an elastic member sleeved on the pivot shaft. When the carrier belt relaxes, the elastic member releases its compression force to drive the pivot shaft to move away relative to the base, thereby maintaining the tension force of the carrier belt. The disclosure also provides a surface mount device using the transmission mechanism, which reduces the likelihood of the carrier belt breaking or jamming, thereby promoting improved precision and yield rate of the surface mounted equipment.

14 Claims, 4 Drawing Sheets

TRANSMISSION MECHANISM AND SURFACE MOUNT DEVICE USING THE SAME

BACKGROUND

1. Technical Field

The present disclosure relates generally to transmission mechanisms and to a surface mount device using the same.

2. Description of Related Art

Surface mount technology (SMT) has been developed after through-hole mount technology, for the mounting of a plurality of electronic components, such as capacitors, resistors, transistors, and integrated circuits onto a printed circuit board (PCB). Recently, for achieving an increased mounting rate, an electrical feeding system is widely used in electronic packaging because of its faster response time. However an electrical feeding system is driven by motors, and the motors' torque output and time sequencing are unstable in actual use, therefore a carrier belt may be jammed because of an inconstant tension, and further resulting in an interruption of supply of the surface mount device. Furthermore, because the motor is subject to many stoppages, restarts and reversals in the feeding process, the lifetime of the motor is thereby decreased and electrical power is wasted.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
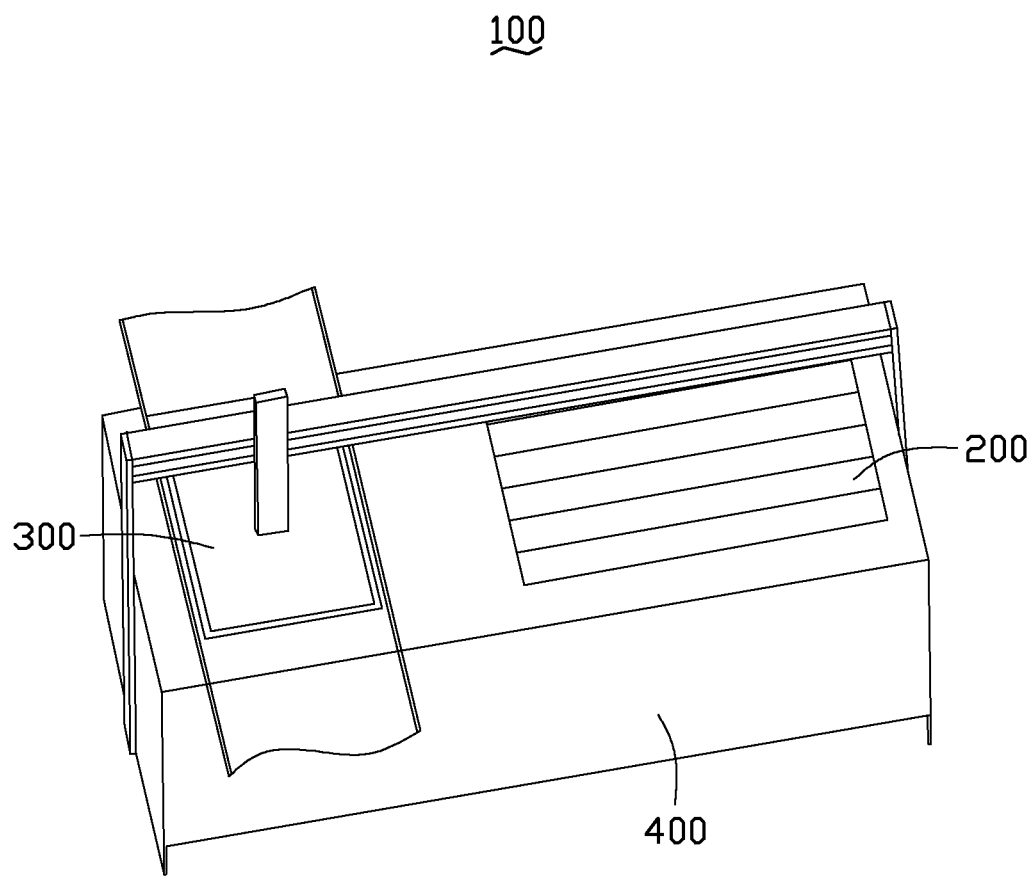
FIG. 1 is an isometric view of one embodiment of a surface mount device including a transmission mechanism.
Figure 2:
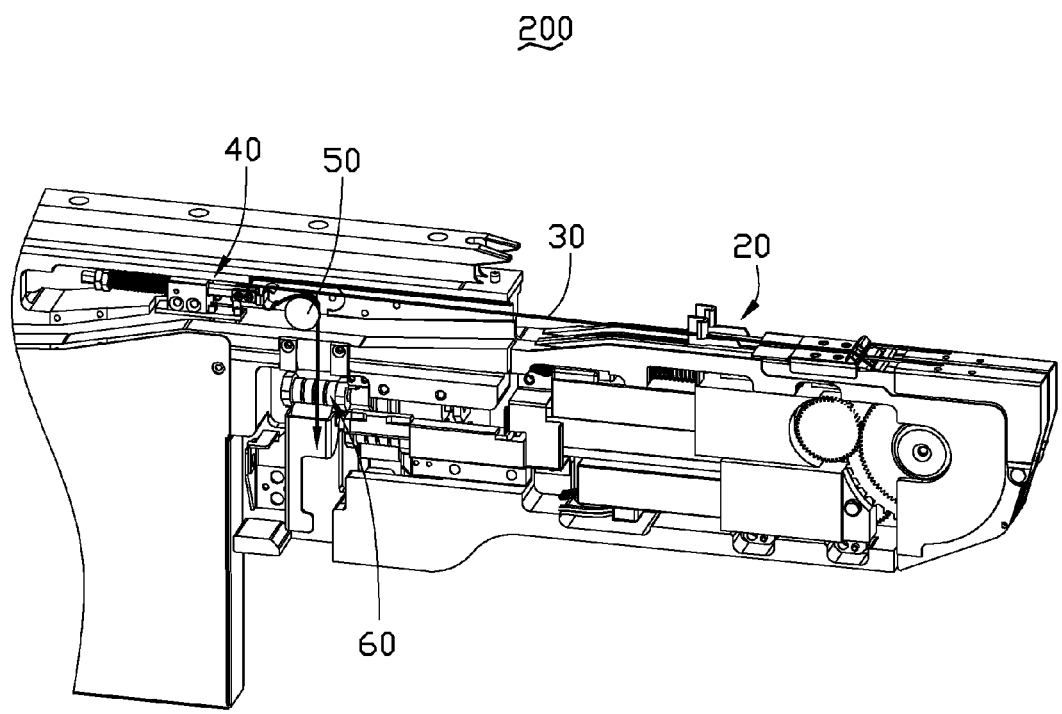
FIG. 2 is an isometric view of part of the transmission mechanism including a tension maintaining module and a belt furling module of the surface mount device of FIG. 1.

Referring to FIGS. 1 and 2, one embodiment of a surface mount device 100 is utilized to place a plurality of electronic components, such as capacitors, resistors, transistors, and integrated circuits onto a printed circuit board (not shown). The surface mount device 100 includes a transmission mechanism 200 for carrying the electronic components, a mounting mechanism 300 for mounting the electronic components, and a working table 400. The transmission mechanism 200 is positioned on the working table 400, and the mounting mechanism 300 is slidably positioned on the working table 400. The surface mount device 100 includes various modules for performing specific functions and features. However, for simplicity, only the modules related to the transmission mechanism 200 are described herein.

The transmission mechanism 200 includes a feeder 20, a carrier belt 30, a tension maintaining module 40, a pulley 50, and a belt furling module 60. The feeder 20 is used to deliver the electronic components via a movement of the carrier belt 30. The tension maintaining module 40, the pulley 50, and the belt furling module 60 are fixed to the feeder 20. The pulley 50 is positioned adjacent to the tension maintaining module 40, and the belt furling module 60 is positioned under the tension maintaining module 40 and the pulley 50. The carrier belt 30 runs along the tension maintaining module 40 and the pulley 50 in that order, and finally connects to the belt furling module 60. The tension maintaining module 40 maintains tension on the carrier belt 30 to prevent the carrier belt 30 from becoming slack. The belt furling module 60 coils or uncoils the carrier belt 30 by means of its rotations in one of two directions.

Figure 3:
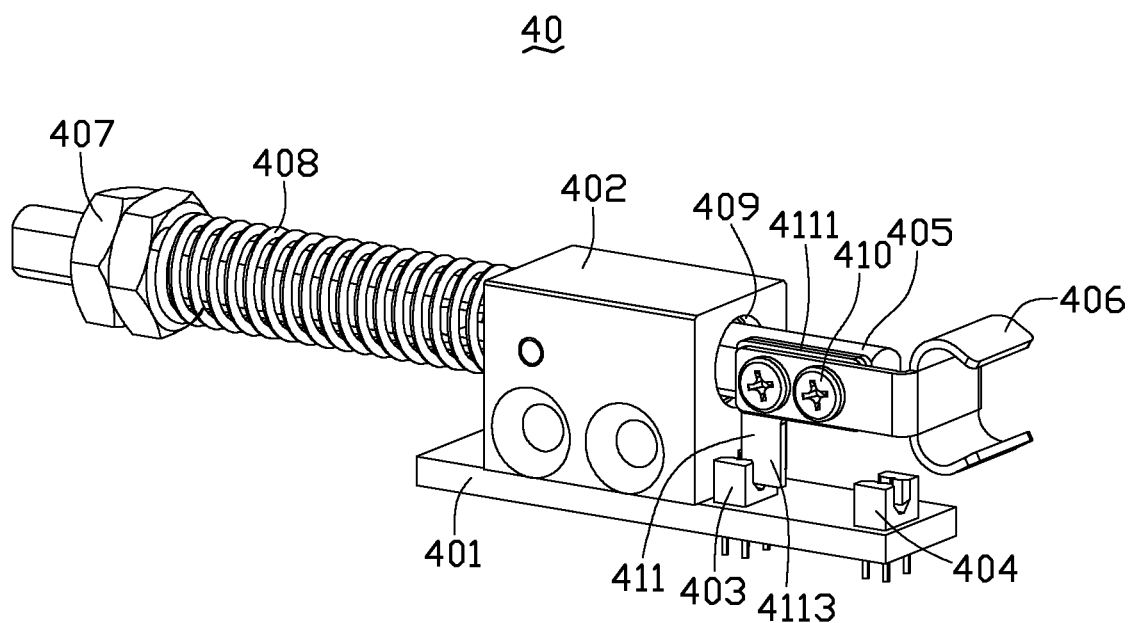
FIG. 3 is an enlarged, isometric view of the tension maintaining module of the transmission mechanism of FIG. 2.

Referring to FIG. 3, the tension maintaining module 40 includes a circuit board 401, a base 402, a first inductor 403, a second inductor 404, a pivot shaft 405, a bracket 406, two locking members 407, an elastic member 408, and a baffle plate 411. In the illustrated embodiment, the locking members 407 are a plurality of locking nuts, and the elastic member 408 is a compression spring.

The base 402, the first inductor 403, and the second inductor 404 are positioned in that order on the circuit board 401. The first inductor 403 and the second inductor 404 are utilized to control the operation of the belt furling module 60. The base 402 defines a through hole 409 for allowing the pivot shaft 405 to pass through. The bracket 406 is fixed to one end of the pivot shaft 405 near the first inductor 403 via a plurality of screws 410, and the carrier belt 30 runs along the side surface of the bracket 406 to connect with the tension maintaining module 40.

The baffle plate 411 is a sheet, and the baffle plate 411 includes a fixing portion 4111 and a sliding portion 4113. The fixing portion 4111 is fixed to the end of the pivot shaft 405 near the bracket 406, and, when driven by the pivot shaft 405, the sliding portion 4113 can slide between the first inductor 403 and the second inductor 404.

The locking members 407 are fixedly sleeved on the other end of the pivot shaft 405 opposite to the bracket 406. The locking members 407 and the bracket 406 are positioned at opposite sides of the base 402. The elastic member 408 is sleeved on the pivot shaft 405, between the locking member 407 and the base 402.

It should be appreciated that the quantity of the locking member 407 may be at least one, or the locking member 407 may be eliminated if one end of the elastic member 408 is fixed to one end of the pivot shaft 405 away from the bracket 406.

Figure 4:
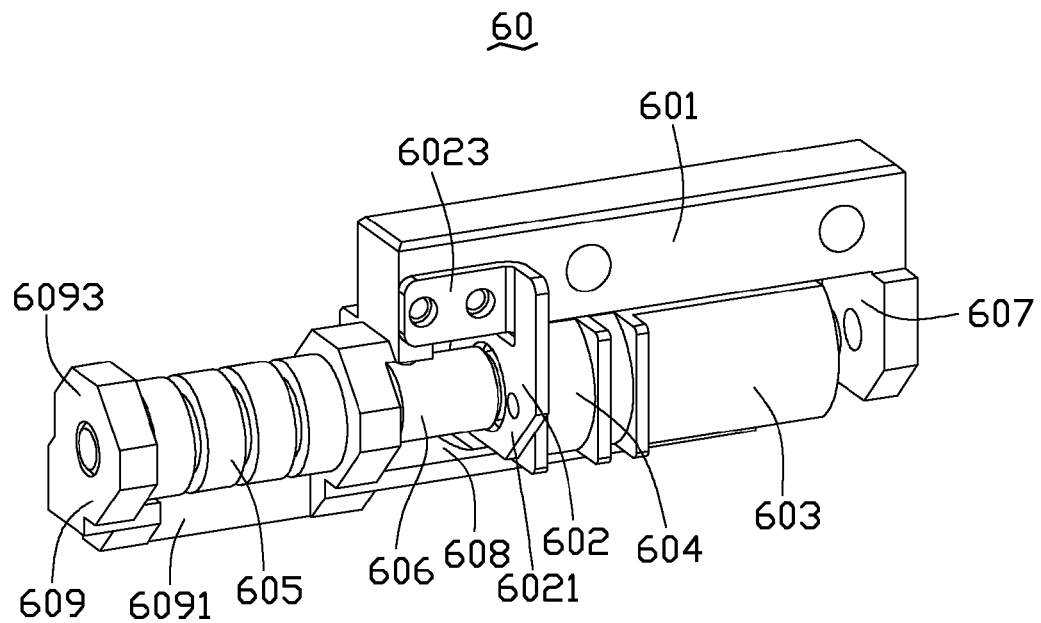
FIG. 4 is an enlarged, isometric view of the belt furling module of the transmission mechanism of FIG. 2.

Referring to FIG. 4, the belt furling module 60 includes a main body 601, a fixing plate 602, a motor 603, a reducer 604, a rolling wheel 605, a connecting shaft 606, and a supporting base 609.

The main body 601 defines a first receiving groove 607 and a second receiving groove 608. The motor 603 is received in the first receiving groove 607, and the reducer 604 is received in the second receiving groove 608. The motor 603 is connected to the first inductor 403 and the second inductor 404. The supporting base 609 is formed as an extension of one side of the main body 601 adjacent to the second receiving groove 608. The supporting base 609 includes a connecting portion 6091 and a supporting portion 6093 protruding out from the connecting portion 6091. One end of the connecting portion 6091 connects to the main body 601, and the supporting portion 6093 is positioned on the other end of the connecting portion 6091. The rolling wheel 605 is rotatably positioned on the supporting portion 6093 and one side of the main body 601.

The fixing plate 602 includes a joining portion 6021 and a bent portion 6023 bent from an end of the joining portion 6021. The bent portion 6023 is fixed to the main body 601, and the joining portion 6021 is positioned between the reducer 604 and the rolling wheel 605 to allow the connecting shaft 606 to pass through and connect the rolling wheel 605 to the reducer 604.

In assembling the transmission mechanism 200, the tension maintaining module 40 is positioned on the feeder 20. The pulley 50 is positioned adjacent to the bracket 406 of the tension maintaining module 40, and the top of the pulley 50 is higher than the bottom of the bracket 406. The belt furling module 60 is positioned under the tension maintaining module 40 and the pulley 50, respectively. The carrier belt 30 runs from the bracket 406 to the pulley 50, and finally connects to the rolling wheel 605 of the belt furling module 60.

Before the transmission mechanism 200 is put to work, the elastic force of the elastic member 408 is controlled by adjusting the distance between the locking member 407 and the base 402, thereby the bracket 406 can effectively tighten the carrier belt 30 when the baffle plate 411 is between the first inductor 403 and the second inductor 404.

When the transmission mechanism 200 is working or operating, the feeder 20 supplies the electronic components to the mounting mechanism 300 for mounting on the PCB, and when the carrier belt 30 has moved through the taut stage during the delivery of the electronic components and becomes slack; then the elastic member 408 of the tension maintaining module 40 releases the spring pressure within it to drive the pivot shaft 405, the bracket 406, and the baffle plate 411 to move away relative to the base 402, and thereby maintaining the tension in the carrier belt 30. After a number of deliveries by the feeder 20, the baffle plate 411 arrives at the first inductor 403, and the circuit board 401 sends a signal to the belt furling module 60 to start the motor 603; the motor 603 drives the rolling wheel 605 to coil and tighten the carrier belt 30, thereby driving the pivot shaft 405, the bracket 406, the baffle plate 411, and the carrier belt 30 to move forward toward the base 402. When the baffle plate 411 arrives at the second inductor 404, the circuit board 401 sends a signal to the belt furling module 60 to stop the motor 603.

The transmission mechanism 200 can maintain the tension in the carrier belt 30 by means of the tension maintaining module 40 and the belt furled mechanism 60 working together, and prevents the carrier belt 30 from being broken through excess tension, or jamming because of excess slack, thereby promoting improved precision and yield rate of the surface mount device 100. In addition, the motor 603 works intermittently only after many deliveries by the feeder 20, thereby avoiding the intensive use and repeated switching on/off of the motor 603, and prolongs the working lifespan of the motor 603, and energy is conserved.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A transmission mechanism, comprising:
   a feeder;
   a tension maintaining module positioned on the feeder;
   a belt furling module positioned on the feeder and under the tension maintaining module, the belt furling module comprising a motor and a rolling wheel driven by the motor; and
   a carrier belt running along the feeder, the tension maintaining module, and the belt furling module in that order;
   wherein the tension maintaining module comprises a base, a pivot shaft slidably positioned on the base, and an elastic member sleeved on the pivot shaft; when the carrier belt becoming slack, the elastic member releases a spring pressure to drive the pivot shaft to move away relative to the base, thereby maintaining the tension in the carrier belt, the tension maintaining module further comprises a circuit board, a first inductor, a second inductor, and a baffle plate; the base, the first inductor, and the second inductor are positioned in that order on the circuit board, the baffle plate is fixed to an end of the pivot shaft near the second inductor, and the pivot shaft drives the baffle plate to move between the first inductor and the second inductor, when the baffle plate arrives at the first inductor, the circuit board sends a signal to the belt furling module to start the motor, and when the baffle plate arrives at the second inductor, the circuit board sends a signal to the belt furling module to stop the motor.

2. The transmission mechanism of claim 1, wherein the tension maintaining module further comprises a bracket, the bracket is fixed to an end of the pivot shaft away from the elastic member, and the carrier belt runs along a side surface of the bracket to connect with the tension maintaining module.

3. The transmission mechanism of claim 1, wherein the tension maintaining module further comprises at least one locking member, the at least one locking member is fixedly sleeved on one end of the pivot shaft near the elastic member, and the elastic member is sleeved on the pivot shaft between the at least one locking member and the base.

4. The transmission mechanism of claim 1, wherein the transmission mechanism further comprises a pulley, and the pulley is positioned adjacent to the pivot shaft, and a top of the pulley is higher than a bottom of the pivot shaft.

5. The transmission mechanism of claim 1, wherein the belt furling module further comprises a main body and a reducer, the main body defines a first receiving groove and a second receiving groove, and the motor is received in the first receiving groove, and the reducer is received in the second receiving groove.

6. The transmission mechanism of claim 5, wherein the belt furling module forms a supporting base on one side of the main body near the second receiving groove, the supporting base comprises a connecting portion and a supporting portion protruding out from the connecting portion, and the rolling wheel is rotatably positioned on the supporting portion and the side of the main body.

7. The transmission mechanism of claim 5, wherein the belt furling module further comprises a fixing plate and a connecting shaft, the fixing plate comprises a joining portion and a bent portion bent from an end of the joining portion, and the bent portion is fixed to the main body, and the connecting shaft passes through the joining portion to connect the rolling wheel to the reducer.

8. A surface mount device, comprising:
   a transmission mechanism for transmitting a plurality of electronic components; and
   a mounting mechanism for mounting the electronic components;
   wherein the transmission mechanism comprises a feeder, a tension maintaining module positioned on the feeder, a belt furling module positioned on the feeder and under the tension maintaining module, and a carrier belt running along the feeder, the tension maintaining module, and the belt furling module in that order; the belt furling module comprises a motor and a rolling wheel driven by the motor, the tension maintaining module comprises a base, a pivot shaft slidably positioned on the base, and an elastic member sleeved on the pivot shaft; when the carrier belt becoming slack, the elastic member releases a spring pressure to drive the pivot shaft to move away relative to the base, thereby maintaining the tension in the carrier belt, the tension maintaining module further comprises a circuit board, a first inductor, a second inductor, and a baffle plate; the base, the first inductor, and the second inductor are positioned in that order on the circuit board, the baffle plate is fixed to an end of the pivot shaft near the first inductor, and the pivot shaft drives the baffle plate to move between the first inductor and the second inductor, when the baffle plate arrives at the first inductor, the circuit board sends a signal to the belt furling module to start the motor, and when the baffle plate arrives at the second inductor, the circuit board sends a signal to the belt furling module to stop the motor.

9. The surface mount device of claim 8, wherein the tension maintaining module further comprises a bracket, the bracket is fixed to an end of the pivot shaft away from the elastic member, and the carrier belt runs along a side surface of the bracket to connect with the tension maintaining module.

10. The surface mount device of claim 8, wherein the tension maintaining module further comprises at least one locking member, the at least one locking member is fixedly sleeved on one end of the pivot shaft near the elastic member, and the elastic member is sleeved on the pivot shaft between the at least one locking member and the base.

11. The surface mount device of claim 8, wherein the transmission mechanism further comprises a pulley, and the pulley is positioned adjacent to the pivot shaft, and a top of the pulley is higher than a bottom of the pivot shaft.

12. The surface mount device of claim 8, wherein the belt furling module further comprises a main body and a reducer, the main body defines a first receiving groove and a second receiving groove, and the motor is received in the first receiving groove, and the reducer is received in the second receiving groove.

13. The surface mount device of claim 12, wherein the belt furling module forms a supporting base on one side of the main body near the second receiving groove, the supporting base comprises a connecting portion and a supporting portion protruding out from the connecting portion, and the rolling wheel is rotatably positioned on the supporting portion and the side of the main body.

14. The surface mount device of claim 12, wherein the belt furling module further comprises a fixing plate and a connecting shaft, the fixing plate comprises a joining portion and a bent portion bent from an end of the joining portion, and the bent portion is fixed to the main body, and the connecting shaft passes through the joining portion to connect the rolling wheel to the reducer.

* * * * *